Figure 1:
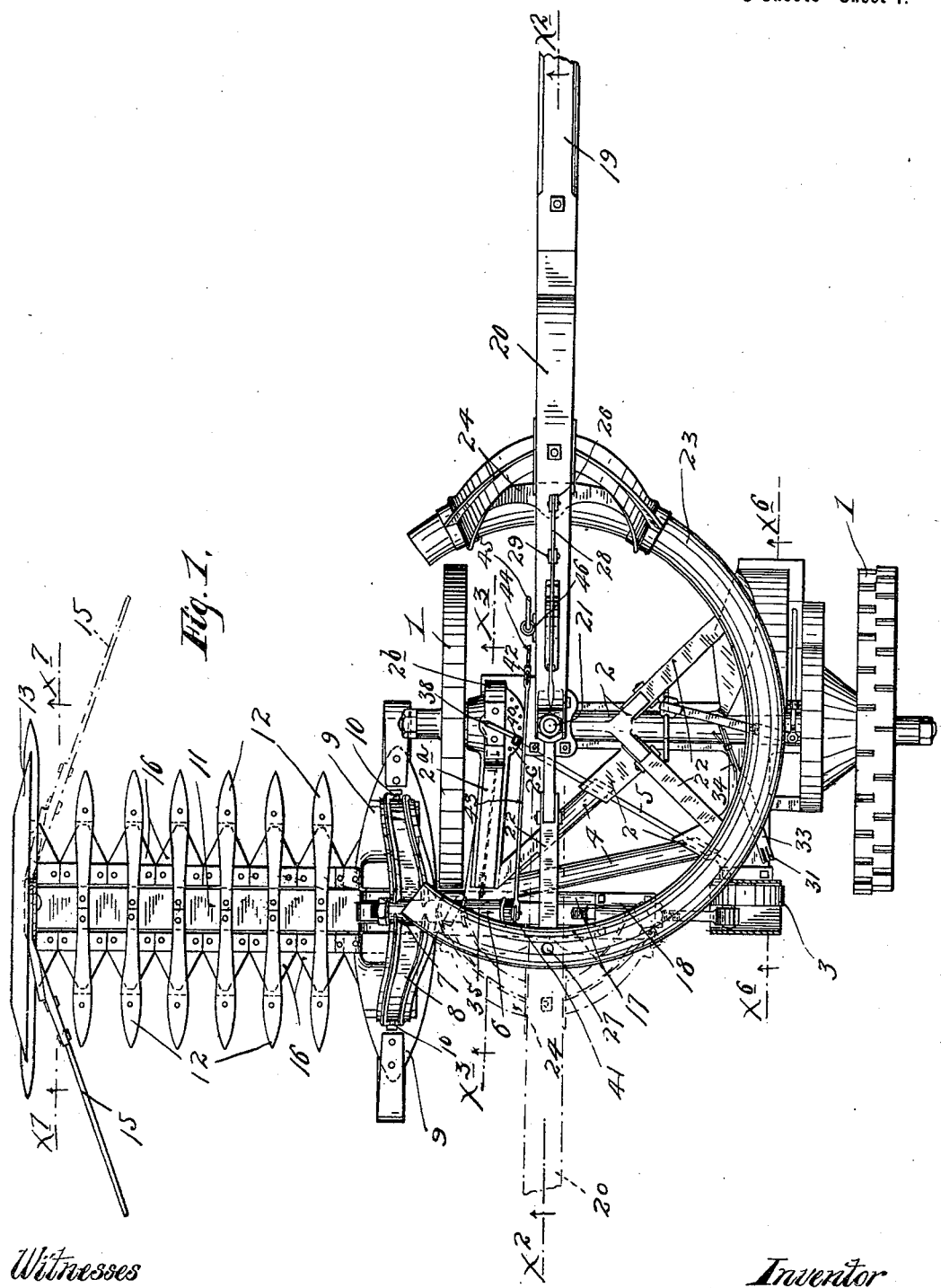

No. 681,316. Patented Aug. 27, 1901.
N. S. HINDBJORGEN.
MOWER.
(Application filed Mar. 18, 1901.)
(No Model.) 3 Sheets—Sheet 1.

Witnesses
Harry Kilgore
Robert Otto.

Inventor
Nils S. Hindbjorgen
By his Attorneys.
Williamson & Murchad

No. 681,316. Patented Aug. 27, 1901.
N. S. HINDBJORGEN.
MOWER.
(Application filed Mar. 18, 1901.)
(No Model.) 3 Sheets—Sheet 2.
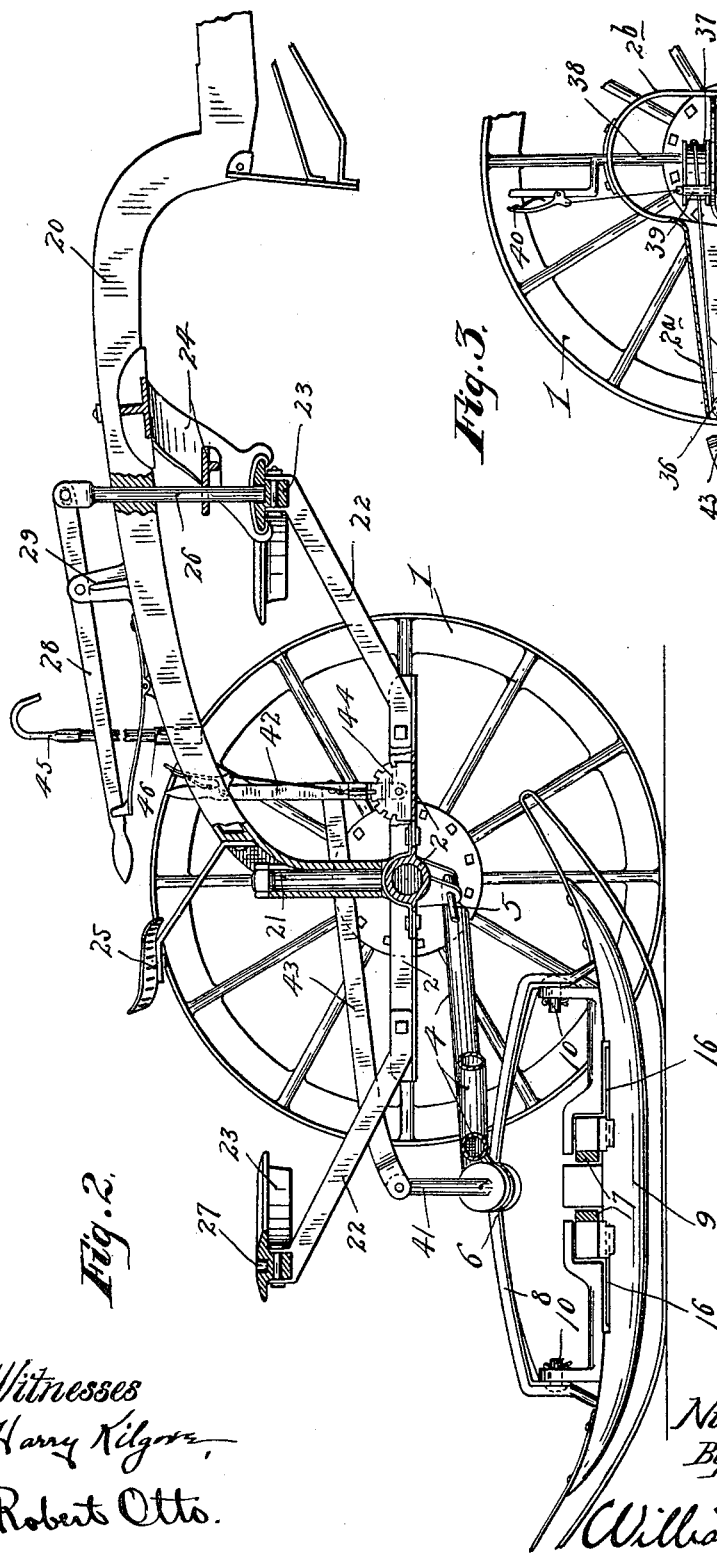
Witnesses
Harry Kilgore
Robert Otto.
Inventor:
Nils S. Hindbjorgen
By his Attorneys.
Williamson Merchant No. 681,316. Patented Aug. 27, 1901.
N. S. HINDBJORGEN.
MOWER.
(Application filed Mar. 18, 1901.)
(No Model.) 3 Sheets—Sheet 3.
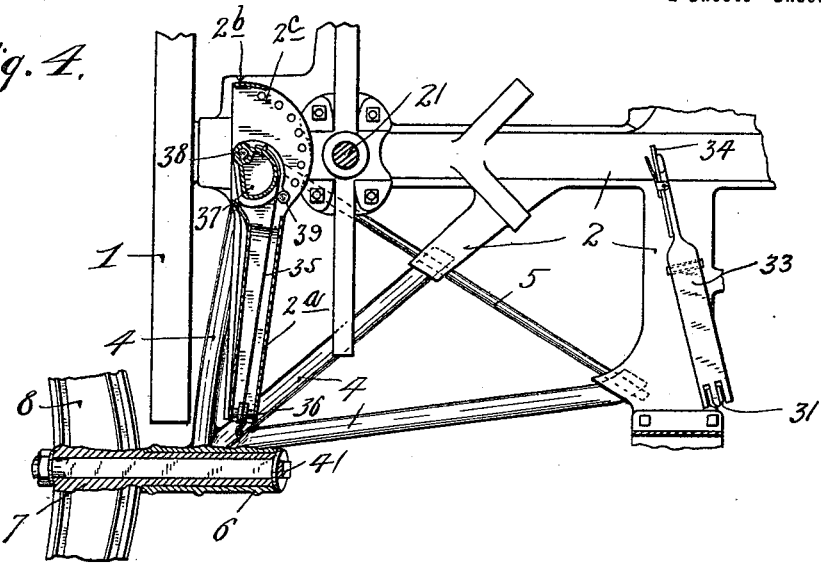
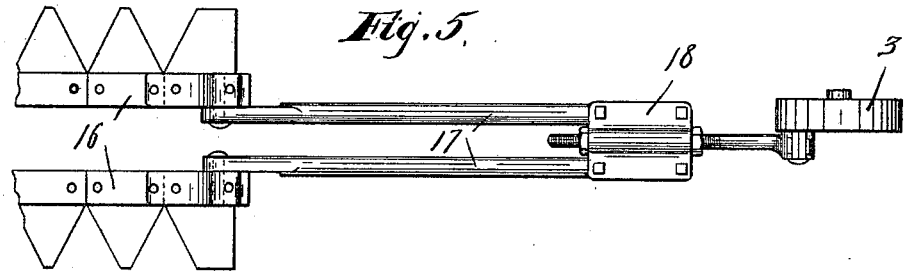
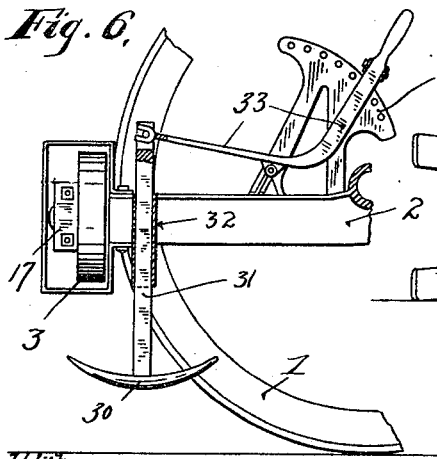
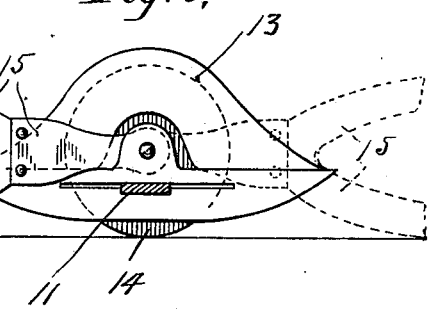
Witnesses
Harry Kilgore
Robert Otto.
Inventor
Nils S. Hindbjorgen
By his Attorneys.
Williamson & Merchant

UNITED STATES PATENT OFFICE.

NILS S. HINDBJORGEN, OF HENDRICKS, MINNESOTA.

MOWER.

SPECIFICATION forming part of Letters Patent No. 681,316, dated August 27, 1901.

Application filed March 18, 1901. Serial No. 51,606. (No model.)

*To all whom it may concern:*

Be it known that I, NILS S. HINDBJORGEN, a citizen of the United States, residing at Hendricks, in the county of Lincoln and State of Minnesota, have invented certain new and useful Improvements in Mowers; and I do hereby declare the following to be a full, clear, and exact description of the invention, such as will enable others skilled in the art to which it appertains to make and use the same.

My invention has for its object to provide an improved mower or similar machine which will operate to cut the grain when run in either direction, thereby adapting the same to be driven back and forth over the same side of a field of grain.

To the above ends the invention consists of the novel devices and combinations of devices hereinafter described, and defined in the claim.

It is a well-known fact that with mowers and similar agricultural machines it is extremely difficult to cut the grass or grain, as the case may be, where it has been blown down or flattened out on the ground. For instance, if it has been so blown that it inclines in an easterly direction it is quite easy to cut the same when the machine is run along the western edge of the field; but it will be extremely difficult and often impossible to make the machine cut when run along the eastern edge of the field. To meet this difficulty, I have provided a machine which will cut in either direction, and this I preferably accomplish in the manner hereinafter set forth in the specific description of the drawings.

The general features of construction of the said machine may be briefly stated as follows: In connection with a mower, which in most of its features of construction may be of any standard or suitable type, I provide a double-edged finger-bar and sickle which are capable of cutting in either direction, and I provide a pole which is reversible, the same being pivoted to a suitable part of a mower-frame. I also preferably provide a grain board or divider at the outer end of the sickle-bar, which is also reversible. With this construction it is only necessary at the sides of the field to move the pole pivotally from the front to the rear of the machine, or vice versa, and this with the construction hereinafter described may be quickly accomplished without unhitching the horses.

The invention is illustrated in the accompanying drawings, wherein like characters indicate like parts throughout the several views.

Figure 1 is a plan view showing a mower constructed in accordance with my invention. Fig. 2 is a vertical section approximately on the line $x^2 \, x^2$ of Fig. 1, some parts being removed. Fig. 3 is a vertical section approximately on the line $x^3 \, x^3$ of Fig. 1. Fig. 4 is a view, partly in plan and partly in horizontal section, showing portions of the mower. Fig. 5 is a detail in plan, showing a portion of the double sickle and driving connections therefor. Fig. 6 is a detail in vertical section approximately on the line $x^6 \, x^6$ of Fig. 1, parts being broken away and other parts shown in full; and Fig. 7 is a vertical section on the line $x^7 \, x^7$ of Fig. 1.

The numeral 1 indicates the wheels, the numeral 2 the frame, and the numeral 3 the driven crank-disk, of a mower of any suitable construction, such as any of the standard machines. The crank-disk 3 is of course given motion under the advance movement of the machine through suitable driving-gears, not necessary for the purposes of this case to consider.

To the main frame 2 (see Fig. 4) a supplemental frame-section 4 is connected by an oblique pivot-shaft 5. At its extended portion, which is at one side of the machine, the supplemental frame 1 has a long sleeve 6, in which the long sleeve-like hub 7 of a shoe yoke 8 is pivotally mounted or swiveled. A double-ended shoe 9 is pivotally connected at 10 to the prongs of the shoe-yoke 8, as best shown in Fig. 2. To this double-ended shoe 9 the inner end of a double-edged finger-bar 11, having reversely-projecting fingers 12, is rigidly secured. To the outer end of the finger-bar 11 is secured a divider-shoe 13, in which is preferably mounted a supporting-wheel 14. It will be noted that the upper prongs of the alined and reversely-projecting fingers 12 extend completely over the top of the sickle-bar and abut or join, so as not to leave openings or shoulders against which the grain would catch. To the divider-shoe 13 a reversible grain board or divider 15 is pivoted for movements to and from the positions indicated by full and by dotted lines in Figs. 1 and 7. A double sickle 16 is mounted in suitable guides on the finger-bar 11 for coöperation with the reversely-projecting fingers 12. By means of a bifurcated pitman 17 the two sections of the sickle 16 are reciprocated from the crank-disk 3. As shown in Fig. 5, the pitman 17 is provided with an adjustable connection 18, by means of which the sickles may be properly adjusted.

The pole 19 is shown as provided with an arched inner end section 20, which is mounted on a vertical pintle 21, rigidly secured at its lower end to the mower-frame 2, as best shown in Figs. 1 and 2. Suitably secured from the mower-frame 2 by means of brackets or braces 22 is a horizontally-extended annular or nearly annular guide 23, which corresponds somewhat to the so-called "fifth-wheel" of a wagon, except that it is relatively much larger. This guide 23 extends concentric to the axis of the pintle 21, and the pole-section 20 is provided with a keeper-bracket 24, the ends of which rest upon the guide 23 and underlap the edges of the same, as best shown in Fig. 2.

The guide 23 is, as shown, in the form of the segment of a ring, being cut away, as shown in Fig. 1, so that when the pole is turned parallel with the finger-bar 11 and projected in the same direction the keeper-bracket 24 will run off from the said guide 23. However, when the pole is shifted at the sides of the field it is turned in a direction away from the finger-bar.

The driver's seat 25 (see Fig. 2) is carried by the pole-section 20. A suitable lock, in the nature of a vertically-movable bolt 26, is mounted in the pole-section 20 and in the keeper-bracket 24 for engagement of either one of two perforations 27, located at diametrically opposite points on the guide 23, the one at the front and the other at the rear thereof. By means of the lock-bolt 26 and perforations 27 the pole may be locked in either of its two operative positions—to wit, either as shown by full lines or dotted lines in Fig. 1. To enable the operator from the seat 25 to manipulate the lock-bolt 26, a spring-pressed lever 28 is connected thereto, the same, as shown, being pivoted to a lug 29 on the pole-section 20.

To prevent the pole and other parts of the mower from dropping onto the ground when the horses are unhitched, I have provided the machine with a supporting-shoe 30, the stem 31 of which works vertically through a suitable guide 32 on the mower-frame 2 and is connected at its upper end to a latch-lever 33, pivoted to and coöperating with a suitable latch-arch 34, also secured on the mower-frame 2. By means of the lever 33 the said supporting-shoe 30 may, as is obvious, be set in different vertical positions.

The supplemental frame 4 and the double finger-bar and sickle may be raised and lowered by any suitable means; but, as shown, this is accomplished by means of a flexible connection 35, connected to the free portion of said supplemental frame 4, passed over a guide-sheave 36 on a projection $2^a$ of the frame 2, and connected to a segmental winding drum or sheave 37 on the lower end of a crank-shaft 38, the lower end of which is suitably mounted in the frame 2 and the upper portion of which is shown as supperted by a yoke-like projection $2^b$ of said frame 2. Further, as shown, the sheave 37 is provided with a latch-bolt 39, which coöperates with a perforated flange $2^c$ of the frame 2. The latch 39 is adapted to be raised by a finger-operated connection 40 on the crank 38. Also, as shown, the inner end of the sleeve 6 is provided with a projecting arm 41, (see Fig. 2,) which is connected to a latch-lever 42 by a link 43. The latch-lever 42 is pivoted to and coöperates with a notched latch-plate 44 on the frame 2. By means of this lever 42 the finger-bar and sickle may be rocked or tilted as in the case of ordinary mowers.

The numeral 45 indicates a light rod provided at one end with a hook, by means of which the operator or driver from his seat may reach the grain board or divider 15 and throw the same from its one extreme position to the other. As shown, the pole-section 20 is provided with a socket 46, in which the uncrooked end of the said rod 45 is adapted to be inserted when out of use.

The operation of the machine above described is clearly obvious from the foregoing description.

It will of course be understood that the machine above described is capable of many modifications within the scope of my invention. It will also be understood that the term "mower" is used in a very broad sense to cover generally agricultural machines capable of use for cutting grass or grain. It will be further understood that thills might be substituted for the pole and that the said devices are herein treated as equivalents.

What I claim, and desire to secure by Letters Patent of the United States, is as follows:

In a mower, the combination with a double-edged finger-bar and a double-edged sickle, of a segmental horizontally-extended guide secured on the mower-frame, a reversible pole pivoted to the mower-frame at the axial center of said guide, and a keeper-bracket on said pole embracing and working on said guide and disconnectable therefrom, by a movement into the space between the ends thereof, substantially as described.

In testimony whereof I affix my signature in presence of two witnesses.

NILS S. HINDBJORGEN.

Witnesses:
L. I. FJEOUTS,
L. M. LERWICK.